UNITED STATES PATENT OFFICE.

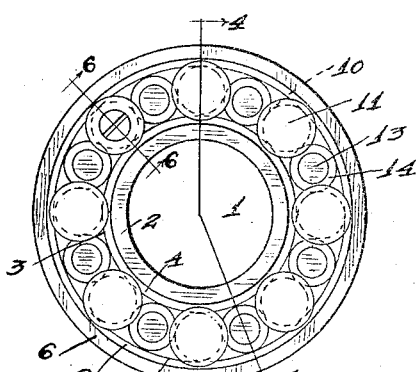
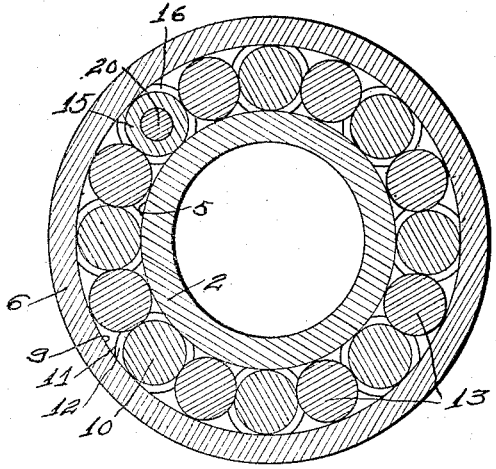
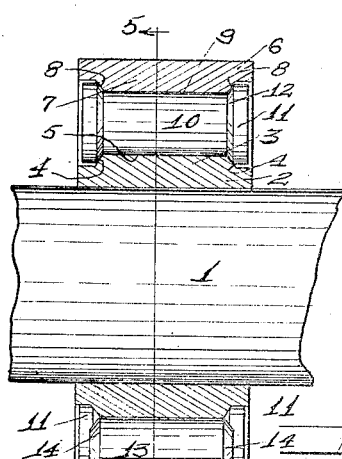
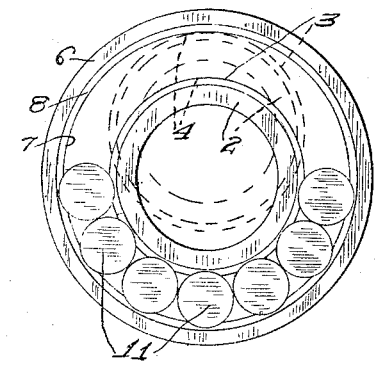
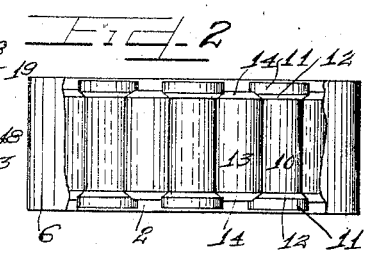
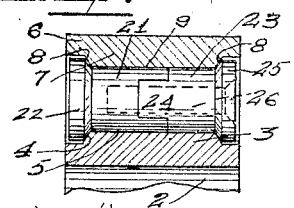

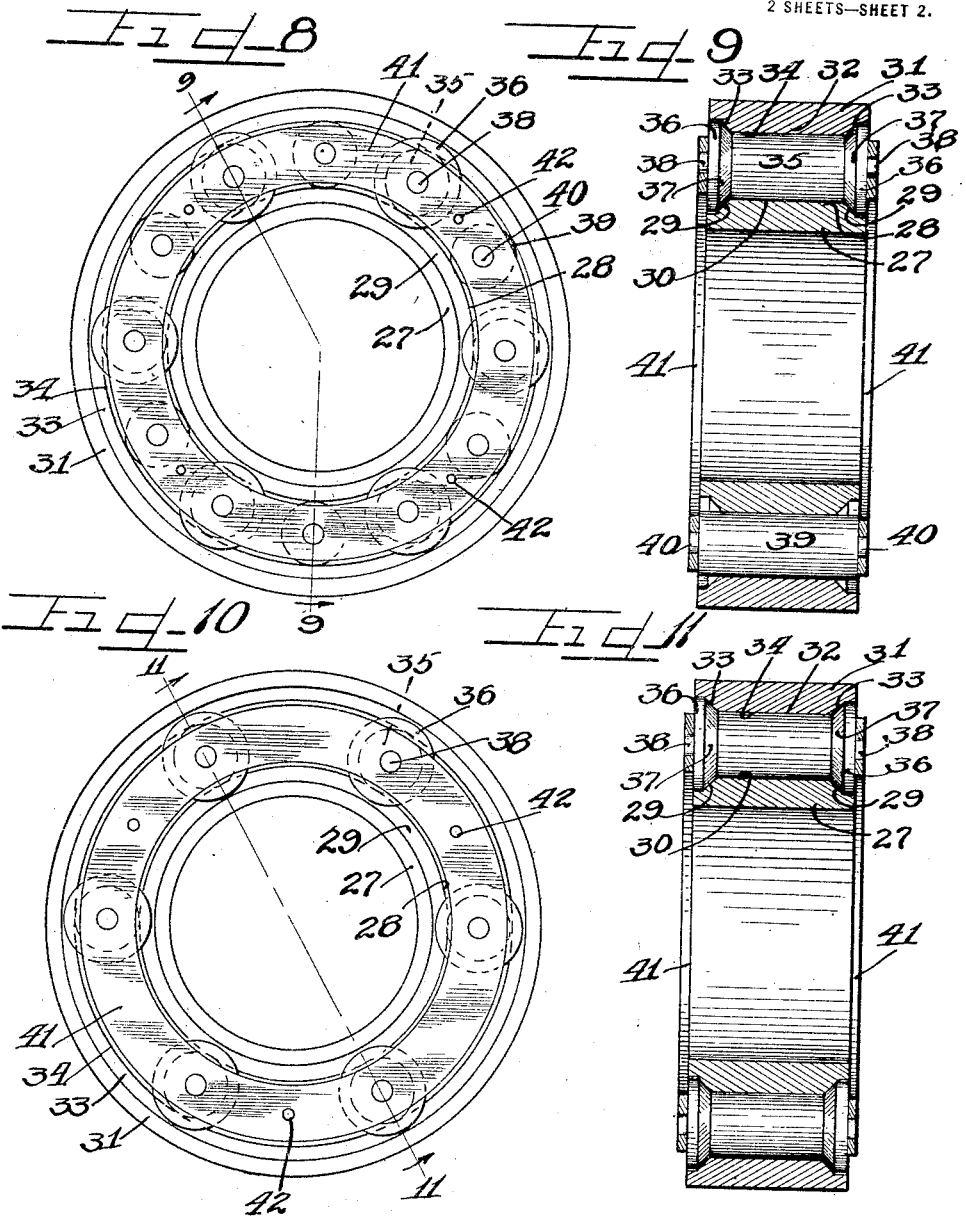

ALBERT E. COOK, OF EVANSTON, AND THOMAS VAN TUYL, OF KANKAKEE, ILLINOIS; SAID VAN TUYL ASSIGNOR TO SAID COOK.

ROLLER-BEARING.

1,364,252.　　　　　Specification of Letters Patent.　　　Patented Jan. 4, 1921.

Application filed December 14, 1918. Serial No. 266,798.

*To all whom it may concern:*

Be it known that we, ALBERT E. COOK and THOMAS VAN TUYL, citizens of the United States, and residents of the city of Evanston, in the county of Cook and State of Illinois, and of the city of Kankakee, in the county of Kankakee and State of Illinois, respectively, have invented certain new and useful Improvements in Roller-Bearings; and we do hereby declare that the following is a full, clear, and exact description of the same, reference being had to the accompanying drawings, and to the numerals of reference marked thereon, which form a part of this specification.

This invention relates to an improved type of anti-friction bearing and method of assembling the same, wherein the bearing members between which the anti-friction members are interposed are displaced from the normal position of operation to insert the anti-friction members therebetween, after which the anti-friction members are distributed and locked in the distributed position to hold the bearing members in the normal relative position.

It is an object of this invention to construct a roller bearing wherein the bearing members are adapted to be positioned close together in an outer bearing ring to permit positioning of the inner bearing ring within the outer bearing ring after which said bearing members are moved into proper spaced relation to hold said outer and inner rings concentric.

A further object of the invention is the construction of a roller bearing wherein the bearing rolls are not moved into their proper position until after an inner bearing ring is inserted into an outer bearing ring.

Another object of the invention is to provide a roller bearing wherein two bearing rings are adapted to be disposed one within the other before the bearing members separating the same are moved to their proper positions to hold said bearing rings concentric.

It is a further object of this invention to provide a roller bearing provided with means for maintaining the roller bearing parts in operating relation with each other to take end thrusts in both directions.

Another object of the invention is the construction of a roller bearing wherein one of the bearing rollers is adapted to be used as a key for releasably locking the roller bearing parts in assembled relation.

It is also an object of the invention to construct a roller bearing having concentric one piece rings separated and held in operating relation by a plurality of bearing rollers one of which is provided with a removable head to permit the same to be used as a master roller for holding said rings and rollers in assembled relation with said rollers disposed so that both ends thereof will remain equidistantly spaced from the axis of rotation of the bearing.

A further object of this invention is the construction of a roller bearing adapted to be readily assembled as a unit and dismembered by providing one of the bearing rollers with a removable head.

It is furthermore an object of the invention to construct a unit roller bearing wherein all of the members are of one piece construction except one which serves as a releasable lock as well as a bearing member to permit easy assembly and dismembering of the roller bearing.

It is an important object of this invention to provide a roller bearing of simple and effective construction wherein the flanged bearing rollers have means associated therewith adapted to hold the roller bearing parts in assembled operating position so that the rollers are at all times positioned with their axes disposed parallel to the axes of the bearing rings and shaft.

Other and further important objects of this invention will be apparent from the disclosures in the specification and drawings.

The invention (in a preferred form) is illustrated in the drawings and hereinafter more fully described.

On the drawings:

Figure 1 is a side elevation of a roller bearing embodying the principles of this invention.

Fig. 2 is a top plan view thereof with parts broken away to show the construction.

Fig. 3 is a side elevation of the device partly assembled and showing the method of assembling in dotted lines.

Fig. 4 is an enlarged sectional view taken on line 4—4, of Fig. 1, with parts in elevation.

Fig. 5 is a section taken on line 5—5, of Fig. 4.

Fig. 6 is an enlarged fragmentary detail section taken on line 6—6, of Fig. 1.

Fig. 7 is a section detail view similar to that shown in Fig. 6, but disclosing a modified form of master bearing roller.

Fig. 8 is a side elevation of a modified form of roller bearing.

Fig. 9 is a sectional view taken on line 9—9, of Fig. 8, showing parts in elevation.

Fig. 10 is a side elevation of another modified form of roller bearing.

Fig. 11 is a section taken on line 11—11, of Fig. 10, showing parts in elevation.

As shown on the drawings:

The reference numeral 1, designates a shaft upon which is mounted a roller bearing embracing the principles of this invention and comprising an inner one piece ring 2, provided with outer peripheral grooves or channels at the outer peripheral edges thereof, thereby forming an integral central raised portion 3, the sides of which are beveled as denoted by the reference numerals 4. The outer peripheral surface of the raised portion 3, affords a bearing surface 5.

Removably associated around the inner bearing ring, is an outer one piece bearing ring 6, having inner peripheral grooves or channels formed at the inner peripheral edges thereof, thereby forming an inner integral central raised portion 7, the sides of which are beveled as denoted by the reference numerals 8. The inner peripheral surface of the raised portion 7, affords a bearing surface 9.

Removably disposed between the inner and outer bearing rings are a plurality of one piece spool-shaped main or primary bearing rollers each comprising a cylindrical shank or body portion 10, having an enlarged head 11, integrally formed at each end thereof. The heads 11, where they connect with the shank 10, are beveled as denoted by the reference numeral 12.

Positioned between the main bearing rollers and separating them from each other, are secondary or auxiliary bearing rollers 13, having the ends thereof beveled as denoted by the reference numeral 14. As clearly shown in Figs. 1 and 2, the main and auxiliary bearing rollers are disposed alternately with respect to one another between the inner and outer bearing rings, to hold said rings concentric with respect to one another. The beveled ends 14, of the auxiliary bearing rollers engage the beveled surfaces 12, of the main roller heads 11, thereby preventing end movement of said auxiliary bearing rollers.

To removably hold the main and auxiliary bearing rollers in rolling contact with each other and in rolling contact with the ring bearing surfaces 5 and 9, to prevent displacement and end movement of the auxiliary rollers a master or locking bearing roller is provided to be removably engaged between two of the auxiliary bearing rollers 13. The master roller when assembled is spool-shaped and equal in size to the main bearing rollers. Said master or locking roller comprises a shank 15, having an enlarged beveled head 16, integrally formed at one end thereof. The master shank 15, is provided with a threaded axial passage 17, which extends through the end of the shank opposite the head 16. The outer end of the passage 17, is enlarged to accord a seat for removably receiving a stub shank or projection 18, which is integrally formed centrally on the inner end of a removable beveled head 19, which is held securely seated against the open end of the shank 15, by means of a retaining screw 20, which projects axially through a passage formed in said head 19, and threads into the threaded passage of said shank 15, as clearly shown in Fig. 6. The head 19, is countersunk to receive the head of the screw 20, seated therein.

In the modified form of the device shown in Fig. 7, the construction is the same as that already described with the exception that the master roller is replaced by a modified form of master roller, which embraces a shank 21, having a diametrical slot or mortise formed in one end thereof, and a beveled head 22, integrally formed on the opposite or outer end thereof. The shank 21, is provided with an axial threaded passage which opens into the mortise. The other half of the master bearing roller comprises a shank 23, having integrally formed on the inner end thereof a diametrical tongue or tenon 24, which is adapted to be removably engaged in the mortise in the inner end of the shank 21. Integrally formed on the other or outer end of the shank 23, is a beveled head 25. The tenon 24, the shank 23, and the head 25, are axially passaged to receive a retaining screw 26, projecting therethrough and threaded into the threaded passage formed in the shank 21. The head of the screw 26, seats flush in the head 25, which is countersunk for the purpose.

Figs. 8 and 9, disclose a modified type of roller bearing embracing an inner one-piece ring 27, provided with outer peripheral grooves or channels at the outer peripheral edges thereof, thereby forming an integral central raised portion 28, the sides of which are beveled as denoted by the reference numeral 29. The outer peripheral surface of the raised portion 28, affords a bearing surface 30.

Engaged around the inner bearing ring, is an outer one piece bearing ring 31, having inner peripheral grooves or channels formed at the inner peripheral edges thereof, to form an integral inner central raised portion 32, the sides of which are beveled as denoted by the reference numeral 33. The inner peripheral surface of the raised portion 32, affords a bearing surface 34.

Disposed between the inner and outer bearing rings 27 and 31, are a plurality of unitary or one piece spool-shaped main or primary bearing rollers each comprising a cylindrical shank or body portion 35, having an enlarged head 36, integrally formed at each end thereof. The heads 36, where they connect with the shank 35, are beveled as denoted by the reference numeral 37. Integrally formed axially on each end of each of the main bearing rollers is a short bearing stub or pin 38.

Spaced between the main bearing rollers 35—36, and separating them from each other, are secondary or auxiliary cylindrical bearing rollers 39, having integrally formed axially on each end thereof a short bearing stub or pin 40. As clearly shown in Fig. 8, the main and secondary bearing rollers are spaced from each other and are disposed alternately with respect to one another between the inner and outer bearing rings to hold the rings concentric. The main and secondary bearing rollers are spaced apart to permit the same during the assembling of the roller bearing to roll together in the outer ring to permit the inner ring to be placed in position, similar to the arrangement disclosed in Fig. 3.

To hold the main and secondary bearing rollers in position a flat retaining ring 41, is disposed adjacent each side of the bearing rings to permit the bearing stubs 38 and 40, of the bearing rollers to rotatably engage in spaced apertures provided for the purpose in said retaining rings. A plurality of rivets or locking pins 42, connect the two retaining rings together and prevent the cylindrical secondary bearing rollers 39, from moving endwise.

Figs. 10 and 11, show another modified form of roller bearing the construction of which is substantially the same as that shown in Figs. 8 and 9, with the exception that the cylindrical secondary bearing rollers 39—40, are omitted.

The method of assembling is as follows:

Referring to Fig. 3, an odd number, in this case 7, of main bearing rollers 10—11, are engaged to seat transversely adjacent one another in the lower half of the outer bearing ring 6. The inner bearing ring 2, is then inserted in the outer ring and moved from the dotted line position to seat upon the seven main bearing rollers as shown in full lines. The main rollers are next separated from each other by moving the same apart and inserting one of the auxiliary bearing rollers 13, between each pair of adjacently disposed main rollers. As shown there are eight auxiliary rollers 13, or one more than the number of main rollers. This arrangement leaves the main and auxiliary rollers disposed loosely between the inner and outer rings with two auxiliary rollers disposed adjacent each other. To hold the auxiliary and main rollers in rolling contact with each other and in rolling engagement with the bearing surfaces 5 and 9, with the beveled auxiliary roller ends 14, engaging the beveled surfaces 12, of the main rollers, the master roller is removably mounted in position between the two adjacent disposed auxiliary rollers to separate the same and lock the roller bearing parts in proper assembled relation. To mount the master roller the open end of the shank 15, is projected through one side of the roller bearing between the bearing rings and the adjacently disposed auxiliary rollers 13, with the beveled portion of the head 16, engaging the beveled surfaces 4 and 8, on one side of the device. The head 19, is then engaged to seat in the open end of the shank 15, and is secured in position by means of the screw 20, as shown, thereby holding the roller bearing parts in proper assembled relation against accidental removal as shown in Fig. 1. Dismembering of the roller bearing to permit replacement or cleaning of any of the parts is believed to be self evident and is just the reverse of the method of assembling.

The mode of assembling the modified form of roller bearing disclosed in Fig. 7, is similar to that already described, and the shank portions 21 and 23, are projected through opposite sides of the device with the tenon 24, engaging in the mortise of the shank 21. The retaining screw is then projected through the head 25, the shank 23, and the tenon 24, and is threaded into the threaded passage of the shank 21.

To assemble the modified roller bearing shown in Figs. 8 and 9, a plurality of main bearing rollers 35—36, are first engaged to seat transversely adjacent one another in the lower half of the outer bearing ring 31, to permit the inner bearing ring 27, to be inserted in the outer bearing ring, similar to the arrangement disclosed in Fig. 3. The main rollers 35—36, are next separated from each other by inserting the cylindrical secondary bearing rollers 39, one between each pair of adjacently disposed main rollers. The retaining rings 41, are next placed in position to permit the bearing stubs 38 and 40, of the bearing rollers to engage in the spaced apertures in said retaining rings, as shown in Fig. 8. The main and secondary bearing rollers are alternately arranged and spaced apart, and are held in proper position against displacement by means of said retaining rings 41, which are locked or secured to each other by means of the transverse locking pins 42, the ends of which may be expanded or riveted.

The assembly of the modified form of roller bearing shown in Figs. 10 and 11, is similar to that above described.

The roller bearings as shown and described are adapted to be readily assembled to form unit roller bearings which may be shipped in assembled condition ready for mounting as a unit. The peculiar construction of the flanged rollers permits the roller bearings to take end thrusts in both directions. The flanged bearing rollers serve to hold not only themselves, but the auxiliary bearing rollers properly positioned at all times with their axes parallel to the axis of rotation of the roller bearing rings and the shaft upon which the roller bearing is mounted.

It is apparent that various other removable forms of master bearing rollers may be substituted or used in place of those shown in Figs. 6 and 7, and that numerous other details of construction may be varied without departing from the principles of this invention, and we therefore do not purpose limiting the patent granted otherwise than necessitated by the prior art.

We claim as our invention:

A roller bearing embracing a pair of concentric rings, a plurality of primary rollers therebetween having enlarged end heads, a plurality of secondary rollers having beveled ends adapted to engage said end heads, said secondary rollers disposed to separate said primary rollers one from the other, and a locking roller removably disposed between two of said secondary rollers to hold said primary and secondary rollers from becoming disengaged.

In testimony whereof we have hereunto subscribed our names in the presence of two subscribing witnesses.

ALBERT E. COOK.
THOMAS VAN TUYL.

Witnesses:
  EARL M. HARDINE,
  CHARLES W. HILLS, Jr.